United States Patent Office 3,136,449
Patented June 9, 1964

3,136,449
COATING COMPOSITIONS FOR CONTAINER LINING
Maurice James McDowell, Media, Pa., and Warren Guy Tyson, Jr., Newark, Del., assignors to E. I. du Pont de Nemours and Company, Wilmington, Del., a corporation of Delaware
No Drawing. Filed June 21, 1960, Ser. No. 37,590
12 Claims. (Cl. 220—64)

This invention relates to coating compositions having a polymer of butadiene-1,3 as the essential organic film-forming component thereof. The invention further relates to improvements in coating compositions formulated with a polymer of butadiene-1,3 as the principal organic film-forming material and adapted for use as a thin protective coating on the interior surface of a metal container for packaging liquid-packed comestibles and potable beverages, especially beer and similar carbonated aqueous beverages. More particularly, the invention relates to an improved package of potable beverage consisting of a hermetically sealed metal container having on the interior surfaces thereof a cured coating of an improved coating composition having a polymer of butadiene-1,3 as the essential organic film-forming material and having the potable aqueous beverage, e.g., beer, in contact with the cured coating.

It is well known in the packaging or canning art that metal containers, e.g., the tin can which is fabricated from sheet steel coated with a thin protective layer of tin, are not adequately protective for packaging many liquid-packed comestibles and potable beverages. To accommodate packaging of such products in metal containers, the interior surface of the metal container is coated protectively with a sanitary varnish or enamel formulated with an organic film-forming material which is adequately resistant to contact with the liquid packaged products during storage periods of ordinary long duration, adequately resistant the physical and chemical conditions of heat-processing and pasteurizing the products in the container and adequately resistant to the mechanical operations of fabricating the interiorly-coated container from precoated sheet stock. Oleo-resinous varnishes have been used extensively for many years as a sanitary coating for the interior of cans and more recently many new synthetic resin and oil compositions have registered advances toward displacing the ordinary oleo-resinous varnishes for can coating. Included among these promising new synthetic organic film-forming materials for can coating are the oily polymers of butadiene-1,3.

Use of these oily polymers of butadiene-1,3 as a sanitary varnish or enamel for coating sheet metal stock in the fabrication of interiorly coated metal containers for packaging liquid-pack food products and potable beverages which are heat-processed or pasteurized in the can is disclosed in U.S. Patents 2,708,639 and 2,875,919. The latter patent refers to earlier art which teaches the preparation of oily polymers of butadiene-1,3 which can be used for this protective coating purpose.

Although coating compositions formulated with oily polymers of butadiene-1,3 have merit in the cured state as an interior coating for metal containers used in product packaging, including products heat-processed and pasteurized in the container, some aqueous beverages exhibit off-taste when packaged in contact therewith. Beer, in particular, has been found to exhibit off-taste under certain conditions when packaged in contact with a can lining having a polymer of butadiene-1,3 as the essential organic film-forming material.

Based on wide variations in the baking conditions for curing the butadiene-1,3 polymer applied as a thin coat to the metal substrate, the magnitude of off-taste is observed to vary with the degree of cure of the polymer. Furthermore, when the coating is in an undercured state, the degree of off-taste is observed to be progressively worse with increasing time between the fabrication of the coated can and its use in packaging the potable liquid. Potable aqueous liquids packaged in these lined containers within 24 hours after their fabrication under ordinary commercial conditions of coating and curing do not exhibit significant off-taste. Later use of corresponding coated cans, e.g., several days, one week, several weeks and several months later as representative of the elapsed time between can fabrication and filling of the coated can by the packager, results in development of off-taste ranging from detectable to significant and to even bad as registered by authoritive tasters. Exposure of the incompletely cured coating of the polymer of butadiene-1,3 to ordinary atmospheric conditions develops components in the coating which are degrading to the taste of potable liquids packaged in contact therewith.

Although baking schedules and conditions can be varied to improve the cure of the coating to a level at which development of taste-degrading bodies is insignificant, such effective schedules and conditions ordinarily are impractical commercially. Usually, beverage cans are labeled by applying indicia of lithographic varnish to the metal surface corresponding to the exterior surface of the can body rather than use paper labels. The ordinary practice is to apply a coat of the protective interior basecoat composition to one side of flat sheet metal body stock, cure the basecoat, apply lithographic varnish to the opposite side of the sheet stock, cure the applied varnish, form the coated sheet into a tubular can body, apply a topcoat over the basecoat on the interior surface of the can body and cure it. Baking schedules and conditions which are suitable for both types of coatings are selected and since the lithographic colors may be affected by high temperatures, the baking conditions and schedule are dictated largely by the curing conditions most suitable for the lithographic varnish. Except for the effect on taste, curing of the polymer of butadiene-1,3 coating under baking conditions adequate for curing the lithographic varnish is considered to be satisfactory, ordinarily. Although increasing the baking temperature and lengthening the baking time improves the cure, excessive cure of the polymer coating results in brittleness and degradation of the fracture resistance of the cured coating. Fracture-resistance is particularly important in coatings intended for use as the interior lining of the metal can because fractures in the coating provide access of the packaged product to the metal with quality degradation resulting. The thin coating must be fracture resistant under the mechanical conditions of stamping container parts from the coated flat metal sheet, under the conditions of fabricating the respective parts into a container and under the chemical and physical conditions associated with packaging, processing and pasteurizing the potable contents of the container.

The primary object of this invention is to provide an improved coating composition having a polymer of butadiene-1,3 as the essential organic film-forming material which when cured under the usual commercial conditions and schedules for baking can coatings results in a coating cured adequately to register a significant improvement in the taste quality retention of potable products packaged in contact therewith. Another object is to provide an improved interiorly coated container for packaging potable liquids, e.g., beer, which inhibits the development of off-taste in the potable liquid in contact with the interior coating having a polymer of butadiene-1,3 as the essentially organic film-forming material. A further object is to provide an improved package of potable aqueous beverage in a sealed metal container having on the interior surface thereof a protective thin cured coat of a coating composition having a polymer of butadiene-1,3 as the essential organic film-forming material, the improvement in said cured coating residing in the resistance to development of off-taste in the potable aqueous beverage in contact with the protective coating.

These objects and other related objects hereinafter disclosed are accomplished by including in the coating composition having a polymer of butadiene-1,3 as the essential organic film-forming material, an effective small proportion of carbon black pigment of the channel or impingement type, the coating composition preferably further containing an innocuous metal drier, including iron drier in an amount corresponding to up to 5000 p.p.m. of iron based on the weight of the polymer of butadiene-1,3 as a curing agent. Ordinarily, an effective proportion of the channel type carbon black pigment is in the range of from 2.5 parts to about 20 parts based on 100 parts of the polymer of butadiene-1,3. At least 2.5 parts of the carbon black pigment are required to register a detectable improvement in the cured coating. Surprisingly, use of a proportion significantly less than 2.5 parts, e.g., 1 part of carbon black per 100 parts of the polymer, yields a cured coating which is inferior to the comparative cured coating which is identical in composition except for the absence of the channel type carbon black pigment. Although up to 20 parts of the carbon black can be used, no significant advantage is detected in the use of more than 15 parts. The preferred proportion is from 4 to 12.5 parts of the carbon black pigment on the indicated basis.

Channel type carbon black pigment is the product of burning natural gas through lava tips with controlled deficiency of air and having the flames impinge against the horizontal lower surface of iron channels; hence, the name impingement or channel black. Combustion conditions and rate of removal of the deposit from the channels effect the quality of the carbon black pigment product, particularly in reference to the particle-size and surface chemistry. Ordinarily, the mean particle-size diameter of these channel black pigment is in the range of 10 to 28 millimicrons. Based on the particle-size distribution, the surface-area for this carbon black is ordinarily at least 90 square meters per gram and may be as high as 270 square meters per gram. Specific surface area as determined by nitrogen adsorption is significantly greater than the specific surface calculated from the particle-size distribution and may be as high as 1000 square meters per gram in the highest quality channel black.

The fixed carbon content of these channel carbon blacks is from about 83% to about 95% as measured by the residue on heating the pigment for 7 minutes at 1750° F. in a closed platinum crucible. The channel carbon black is recognized as having a surface oxide complex $C_xO_y$ which contributes significantly to the volatile loss on heating. Although the mechanism is not understood by which the small proportion of channel type carbon black functions in inhibiting development of off-taste in potable aqueous liquids packaged in contact with a cured coating having a polymer of butadiene-1,3 as the essential film-forming material, it is believed that the peculiar surface activity and the $C_xO_y$ complex of this carbon black pigment are pertinent to the functioning as the inhibitor of off-taste. In contrast, furnace type carbon black pigments, ordinarily having a fixed carbon content of about 99% and higher, are ineffective toward inhibiting development of off-taste. Lamp black and activated carbons of the decolorizing and deodorizing types are ineffective also for inhibiting the development of off-taste.

Although any of the above characterized channel type carbon black pigments or mixtures thereof can be used, those characterized by the particle-size range of 15 to 28 millimicrons and the corresponding lower range of surface area are preferred ordinarily because of better processing ease in dispersing these grades of channel type carbon black pigment and the significantly lower cost of these grades.

Characteristics of typical preferred channel type carbon black pigments available commercially are:

TABLE 1

|  | Raven | Monarch 81 | "Superba" | Monarch 71 | Carbolac 46 |
| --- | --- | --- | --- | --- | --- |
| Mean particle-size, millimicrons | 25 | 26 | 18 | 18 | 15 |
| Effective surface area, square meters per gram | 105 | 95 | 146 | 145 | 165 |
| Fixed carbon, percent | 93.8 | 95 | 90 | 95 | 86 |
| Volatile content on moisture free basis | 6.2 | 5 | 10 | 5 | 14 |

For purposes of this invention, the polymer of butadiene-1,3 is defined as a polymer having a content of at least 75% by weight of polymerized butadiene-1,3, i.e., the polymer may be either a homopolymer of butadiene-1,3 or a copolymer thereof having up to 25% of an ethylenically unsaturated monomer copolymerized therewith. Preferred useful copolymers have a monovinylidene hydrocarbon monomer, e.g., styrene or methyl styrene, copolymerized with the butadiene-1,3. These homopolymers and copolymers may be modified with up to about 2% of an anhydride of an ethylenically-unsaturated carboxylic acid, e.g., maleic anhydride or citraconic anhydride either by copolymerization or by after-treatment of the polymer. Polymers of butadiene-1,3 useful in practicing this invention can have an average molecular weight in the range of 700 to 20,000, preferred polymers being oily liquids having an average molecular weight of 1000 to 5000. Preparation of useful polymers of butadiene-1,3 having these characteristics are described in Miller's U.S. Patent 2,708,639, Gleason U.S. Patents 2,652,342 and 2,672,425, and Garber U.S. Patent 2,560,164. These polymers of butadiene-1,3 are available commercially. The latter polymer is the product of free radical catalyzed polymerization with the butadiene polymer being terminated with from 1.5 to 2 equivalents of $>C=O$ per mol of polymer or about 0.06 equivalent per 100 grams of the polymer.

The composition of the volatile liquid solvent portion of the liquid coating composition is not critical. Preferably, the solvent is a hydrocarbon solvent for the polymer of butadiene-1,3. Any of the volatile aromatic hydrocarbons, aliphatic hydrocarbons and mixtures thereof which have ordinarily a boiling range within the limits of about 80° C. to about 220° C. and are used ordinarily in paint, varnish and enamel formulations can be used in preparing the liquid coating compositions or for thinning these compositions to provide more desirable application characteristics. For reasons of economy, mineral spirits, V.M. and P. naphtha, and high solvency petroleum naphthas are preferred over the straight aromatics such as toluol and xylol. Alcohols, esters, ketones, ethers, ether alcohols, esters of ether alcohols and other ordinary varnish solvents compatible with the hydrocarbon solvent can be included in the volatile liquid portion when these modifying components serve a desirable function. The volatile liquid portion is preferably free of water.

The liquid coating compositions can be formulated practically at a non-volatile content as high as 70% by weight. For some purposes, it is practical to apply the coating at a non-volatile content as low as 5%. In high speed production line coating of a sheet metal ribbon and curing the coating thereon in the flat prior to stamping the coated container parts therefrom, the non-volatile content is adjusted to that which is sufficient to provide the desired protective coating weight. The volatile solvent balance is formulated to provide the desired flow characteristics and volatility under the coating conditions. Ordinarily, a non-volatile content of 25% to 60% is preferred for coating under present commercial production line conditions for container fabrication.

Although adequate curing of the coating at the ordinary protective coating weight can be effected by heating in the absence of curing accelerators, the temperature time factor for ordinary coating speeds is too high for universal use on all of the container parts. A high temperature which may be suitable for curing the coated end-closure stock is usually unsatisfactory for curing the coated body stock which carries a lithographic varnish on the metal surface opposite that being coated with the butadiene-1,3 polymer coating. Lengthening the curing time at a temperature which can be tolerated by the lithographic varnish is impractically long in effecting adequate cure of the butadiene-1,3 coating in the absence of an accelerator. Iron drier is particularly useful among the metal driers as an innocuous accelerator. The curing accelerator must be innocuous since the packaged potable liquid will be in contact with the coating containing the accelerator. Although other ordinary metal driers, e.g., cobalt and manganese, are effective in accelerating the cure of the coating, these metallic driers are not as effective as Fe toward inhibiting the development of off-taste at satisfactory curing level. Iron driers can be used at concentrations up to 5000 p.p.m. of iron based on the weight of the polymer of butadiene-1,3. The preferred practical range is from about 25 p.p.m. to about 2500 p.p.m. of iron. Soluble iron soaps of fatty acids, iron 2-ethylhexoate, iron naphthenate and iron salts of rosin acids can be used as the iron drier. The iron drier can be in combination with other innocuous metal driers, e.g., zinc, cobalt and manganese. In such drier combinations, the iron drier is preferably the major component and the total drier metal is preferably no greater than 2500 p.p.m.

The liquid coating composition can contain still other innocuous additives which serve a useful function. Organic solvent soluble derivatives of titanium, such as the orthotitanate esters and titanium acylates of fatty acids can be included in the coating composition to improve the fracture resistance of the cured coating as described in Henderson U.S. Patent 2,875,919. The presence of these titanium derivatives is not critically essential to the practice of the present invention. The indicated effective proportion of channel type carbon black pigment contributes also to improvement of fracture resistance of the cured coating of polymer of butadiene-1,3 and this contribution to the fracture-resistance is adequate in the absence of the titanium derivative in some instances, e.g., when the coated sheet metal is not subjected to deep-drawing. Coated sheet metal body stock is not subjected to as deep metal drawing as the end-closure stock. A coating, free of the titanium derivative, which exhibits adequate fracture resistance on the body parts may not exhibit adequate fracture resistance on the end-closures which are drawn more deeply. For purposes of providing additional margin of safety in fracture-resistance, the coating compositions preferably include the soluble organotitanium compound as described in the reference patent.

Although other innocuous pigments can be included with the effective proportion of the channel type carbon black pigment for pigmentation of the coating composition, preferably the carbon black pigment is the sole pigment since the primary function of the coating is protection against taste deterioration of potable liquids packaged in metal containers lined with this protective coating. The decorative value of the polymer coating on the interior surface of the container is unimportant ordinarily.

Other useful modifiers which can be present in the coating composition include liquid polymers of methyl siloxane and methyl-phenyl siloxane which improve the wetting of the metal substrate by the coating, inhibit eye-holing and improve the surface characteristics of the coating when used in ordinary proportions up to several tenths of one percent based on the total weight of the liquid coating composition.

Preferably, the coating composition contains the polymer of butadiene-1,3 as the sole essential organic film-forming material, but innocuous resins and plasticizers which are compatible with the polymer of butadiene-1,3 and which do not have a significant taste or odor contribution can be included in minor proportions, e.g., preferably no greater than about 30% based on the total weight of the organic film-forming material. Trialkylorthophosphates are typical useful plasticizers and typical useful hydrocarbon resins for modifying the butadiene-1,3 polymers include "Piccopale" hard hydrocarbon resins resulting from polymerization of diene and olefin unsaturates derived from deep cracking of petroleum, these resins having a melting point in the range of from about 70° C. to about 100° C., "Piccotex" hydrocarbon copolymer of modified styrene having a melting point from about 100° C. to about 120° C., and polyisobutylene.

In providing the container with the protective coating, the liquid coating is applied in an amount sufficient to deposit a dry coating weight ranging from about 2 milligrams to about 15 milligrams per square inch of coated surface, preferably 4 to 12 milligrams. Ordinarily, this coating weight is applied in two coats, but may be applied in one coat, particularly to end-closure sheet stock where curing can be carried out at the higher temperatures. In the two coat operations with can bodies, the first coat is applied and cured prior to container fabrication and the second coat applied and cured after the fabrication. Curing of the coating on the metal is conducted under temperature and time conditions which effect a cure equivalent to heating for at least 5 minutes at a temperature of at least 275° F., preferably at least 300° F. at which temperature a curing time of 5 to 12 minutes is preferred. Container parts having lithographing varnish on the exterior surface and the polymer of butadiene-1,3 on the interior surface are baked under conditions which can be tolerated by the two types of coatings, with the temperature conditions being dicated ordinarily by the heat resistance of the varnish. The ordinary lithographic varnishes do not tolerate rebaking at temperatures significantly above 350° F., and, thus, the interior coating on lithographed parts is necessarily cured at temperatures in the range of 275° F. to 350° F. The practical baking time under these conditions preferably is 5 to 15 minutes, although a longer baking period up to 60 minutes does not effect the polymer coating adversely. In the absence of the lithographing varnish, as in the case of end-closures, a higher baking or curing temperature up to 420° F. can be used. Still higher curing temperatures can be used, such as in flame-curing where temperatures may be as high as about 1800° F. Exposure to flame temperatures must be obviously short to avoid decomposition, the exposure time being selected to provide a degree of cure preferably no greater than that equivalent to baking for 8 minutes at 420° F.

The following specific examples are illustrative of the processes and products of the invention. The parts and percentages expressed therein and in the appended claims are on a weight basis unless stated otherwise.

Example 1a

First portion:                                        Parts by wt.
    Butadiene-1,3 polymer solution—50% in mineral spirits _____ 200
    Channel type carbon black pigment _____ 25

Second portions:
    Butadiene-1,3 polymer solution—50% in mineral spirits _____ 250
    Iron octoate drier solution—1% Fe in mineral spirits _____ 50
    Mineral spirits (B.R. 145°–215° C., A.P. 57° C.) _____ 100

625

Example 1b

First portion:
    Same as in Example 1a _____ 225

Second portion:
    Butadiene-1,3 polymer solution—50% in mineral spirits _____ 750
    Iron octoate drier solution—1% Fe in mineral spirits _____ 100
    Mineral spirits (B.R. 145°–215° C., A.P. 57° C.) _____ 175

1,250

The butadiene-1,3 polymer is a homopolymer of butadiene-1,3 prepared by following the teachings of Miller U.S. Patent 2,708,639, i.e., polymerizing butadiene-1,3 with $BF_3$-etherate-water complex as the catalyst and using mineral spirits as the solvent for the polymer. The homopolymer is characterized by a molecular weight of about 1500.

The channel type carbon black is the Raven type described in Table 1. The carbon black is dispersed in the solution of butadiene-1,3 homopolymer by the sand grinding technique described in Hochberg U.S. Patent 2,581,414 using the proportions shown as the First Portion. Alternatively, any of the ordinary methods for dispersing pigment in an oil vehicle can be used in place of the sand grinding technique. The composition is completed by adding the ingredients of the Second Portion and mixing the combined portions until uniform.

The mineral spirits are characterized by a boiling range of from 145° to 215° C. and an aniline point of 57° C.

COMPARATIVE COMPOSITION A

Parts by wt.
    Butadiene-1,3 polymer solution—50% in mineral spirits _____ 2,000
    Iron octoate drier solution—1% Fe in mineral spirits _____ 200
    Mineral spirits _____ 300

2,500

The ingredients of this composition are the same as used in Examples 1a and 1b. The concentration of iron drier is 2,000 parts of Fe per one million parts of the homopolymer by weight.

Comparative compositions A–1 and A–2 are prepared by mixing aliquot portions of the composition A with a sufficient amount of the composition of Example 1a to provide a carbon pigment proportion of 0.1 part and 1 part respectively per 100 parts of the butadiene-1,3 homopolymer.

The respective Examples 1a, 1b and comparative A, A–1 and A–2 compositions are applied separately to the interior tin-plate sheet steel surface of can bodies of the type used ordinarily in beer can fabrication. The coatings correspond to a dry coating weight of about 5 milligrams per square inch and the respective coatings are cured by heating at 320° F. for about 8 minutes. These coated can bodies are weighed immediately on cooling to room temperature and reweighed periodically during storage in a constant temperature room having a temperature of about 77° F. and a relative humidity of about 50%. Table 2 shows the change in weight of the coating on aging in an ordinary atmosphere in reference to the initial weight.

TABLE 2

| Aging | 4 hours | 28 days | 70 days |
|---|---|---|---|
| | Percent | Percent | Percent |
| Example 1a | −2.0 | −0.4 | −0.1 |
| Example 1b | −0.5 | 1.0 | 1.5 |
| Comparative A | 1.2 | 3.1 | 4.6 |
| Comparative A–1 | 6.9 | 9.8 | 11.4 |
| Comparative A–2 | 12.5 | 15.8 | 18.1 |

Sheet metal can stock, basecoated with oily liquid homopolymer of butadiene-1,3 at a coating weight of about 3 milligrams per square inch cured by baking for 10 minutes at 385° F., is coated with the respective example coating compositions and the comparative coating compositions at a coating weight corresponding to 5 to 6 milligrams of dry coating per square inch and the applied coating is cured by baking for 8 minutes at a temperature ranging from 280° F. to 360° F. These coated container parts are fabricated at a series of containers each having one end open. These containers are stored and then, after certain intervals of storage, they are filled with a potable aqueous liquid which is hermetically sealed in the container and pasteurized therein. In one series of taste tests, "Purock" pure distilled water is packaged in the respective containers immediately after the container is fabricated and in other identical containers whereof the cured coating has aged in storage for several days, one week, two weeks and seven weeks respectively. The packaged water is pasteurized in contact with the respective aged interior coatings of the hermetically sealed containers by heating for 30 minutes at 150° F. After several days, the respective packages are opened and aliquots of the packaged water are tasted by a panel of four tasters and rated for off-taste in reference to the unpackaged pure water using a scale of 0 to 10, where 0 represents no detectable off-taste and 10 represents significant off-taste. The coating of Example 1a exhibits no significant off-taste effect due to aging of the cured coating. The mean taste rating for the first three weeks of aging prior to packaging is 0 and even at seven weeks aging prior to packaging the mean taste rating is 1.5. The coating of Example 1b is similarly resistant to off-taste development, having a mean rating of 0.5 at two weeks and 2 at seven weeks. The comparative composition A, which is free from carbon black, develops off-taste in the packaged water, the mean rating being about 3 at one to two weeks and about 4 at seven weeks. Comparative compositions A–1 and A–2 containing 0.1% and 1.0% of carbon black respectively based on the film-forming polymer develop more off-taste than the comparative composition A which is free of carbon black, the mean off-taste ratings being 6 and 7 respectively after the cured coatings are aged two weeks prior to packaging.

Example 2

First portion:                                          Parts by wt.
    Butadiene-1,3 polymer solution—50% in mineral spirits _____ 355
    Channel type carbon black pigment _____ 45

Second portion:
    Butadiene-1,3 polymer solution—50% in mineral spirits _____ 555
    Metal drier-iron octoate—2% Fe in mineral spirits _____ 22.5
    Tetraoctyltitanate _____ 9.1
    Polydimethylsiloxane DC–200 _____ 0.1
    Mineral spirits (B.R. 145°–215° C., A.P. 57° C.) _____ 13.3

1,000.0

The butadiene-1,3 homopolymer solution is prepared as follows: 452.5 pounds of butadiene-1,3 distilled at 32° F. in a nitrogen flushed still are charged into an evacuated polymerization vessel having agitation means and adjusted to reflux. To this charge are added about 20 grams of tertiary butyl catechol in solution in 4.5 pounds of mineral spirits. Then $BF_3$ etherate-water catalyst is added in the proportion of 1 pound of water premixed with 20.95 pounds of the $BF_3$ etherate complex. This catalyst is added at a constant rate over 85 minutes while controlling the reaction vessel temperature at 32° F. and agitating. The charge is then held at 32° F. for 155 minutes and thereafter a suspension of 16.5 pounds of lime and 11 pounds of diatomaceous earth of the filtering type in 120 pounds of mineral spirits are pumped into the raction vessel. About 246 pounds of mineral spirits are added and the polymer/solvent mixture is vacuum distilled to 140° F. and 560 mm. Hg to remove unpolymerized butadiene-1,3, leaving a polymer concentration in solution ordinarily of about 50% by weight. The resulting solution is filtered through natural kraft filter paper.

The first portion of the coating formulation is prepared by dispersing the carbon black in the solution of polymer as described in Example 1. The ingredients of the second portion are added in the resulting dispersion and mixed to provide a uniform composition.

The coating composition at about 50% non-volatile content exhibits a viscosity in the range of 56 to 76 seconds at 77° F. using a Ford #4 viscosity cup. The composition is adjusted to the desired lower application viscosity and coating weight per coat by the addition of mineral spirits or V.M. and P. naphtha. For example, 100 parts of the composition are reduced with 40 parts of mineral spirits to provide a dry film of about 5 milligrams per square inch when 30 ml. of the reduced composition are spun on a metal disc for one minute at 400 r.p.m.

This coating composition, applied as an interior can coating as described in Example 1 with the resulting lined containers evaluated for off-taste development in pure water after aging of the cured coating prior to packaging, exhibits the same excellent resistance to off-taste development at the cured coating of Example 1a. These results indicate that the titanate ester and the siloxane, not present in the Example 1a composition, are innocuous to the development of off-taste. Presence of effective small proportions of the organo-titanium compound enhances the fracture resistance of the cured coating as taught by Henderson U.S. Patent 2,875,919. Inasmuch as the carbon black pigment has a reinforcing effect on the cured polymer coating, ordinarily, a lesser amount of the organo-titanium compound is required in comparison with the amount necessary to achieve the desired level of fracture resistance in the absence of the channel-type carbon black pigment. The polysiloxane improves the surface characteristics of the coating, particularly in reference to wetting the metal substrate which is pertinent to inhibiting eye-holes in the coating.

In a practical evaluation, by a commercial fabricator of containers, where the coating of Example 2 is compared directly with containers used currently in beer packaging, results indicate that the cured coating of Example 2 is resistant to the development of off-taste in beer and is about equal in that respect to vinyl chloride/vinyl acetate copolymer beer can coatings in use currently.

In the evaluation, polymer of butadiene-1,3 coatings similar to Example 2, except for the omission of the carbon black pigment and variations in the metal drier, are included with the vinyl composition as comparative products.

The following Table 3 shows the taste results for beer packaged in the containers interiorly coated with the cured composition of Example 2 in comparison with typical comparative commercial can coatings based on ratings by an expert beer taster where the numerical ratings have the following meaning:

80 is OK
75 is passing
70 is borderline
65 is off-taste
60 and below is definitely off-taste and worse
10 is very badly off-taste

TABLE 3

| Container identity: | Taste rating |
|---|---|
| X-2—Example 2 composition | 75–80 |
| A-3—Polybutadiene plus Fe drier | 65 |
| A-4—Polybutadiene plus Fe drier | 50 |
| A-5—Polybutadiene plus Fe drier | 65 |
| B—Polybutadiene plus Co drier | 50 |
| B-1—Polybutadiene plus Co drier | 65 |
| C—Polybutadiene plus Co/Mn drier | 10 |
| C-1—Polybutadiene plus Co/Mn drier | 65 |
| C-2—Polybutadiene plus Co/Mn drier | 60 |
| D—Vinyl top coat over epoxy basecoat | 80 |

The comparative compositions used on the containers identified by the alphabetical designations A-3 through C-2 are similar to Example 2 except for the omission of the carbon black pigment and variations in metal drier content and drier type thereof. The comparative container coatings are more specifically identified as follows:

A-3  Polybutadiene plus 2,000 p.p.m. of Fe with siloxane and titanate ester as in Example 2, the coating being baked 8 minutes at 300° F.
A-4  Polybutadiene plus 1,000 p.p.m. of Fe with 400 p.p.m. of siloxane and titanate ester as in Example 2, the coating being baked 8 minutes at 280° F.
A-5  Same as A-4, the coating being baked 8 minutes at 300° F.
B  Polybutadiene plus 300 p.p.m. Co, as octoate, with siloxane and titanate ester as in Example 2, the coating being baked 8 minutes at 300° F.
B-1  Same as B, the coating being twice baked for 8 minutes at 300° F.
C  Polybutadiene plus 500 p.p.m. Co and 50 p.p.m. Mn with 400 p.p.m. siloxane and titanate ester as in Example 2, the coating being baked 8 minutes at 280° F.
C-1  Same as C, the coating being baked 8 minutes at 320° F.
C-2  Same as C except the drier being 200 p.p.m. Co and 750 p.p.m. Mn, the coating being baked 8 minutes at 350° F.

Taste ratings on containers designated X-2 having the Example 2 coating are based on coating weights ranging from 3.5 to 7.5 milligrams per square inch, the respective Example 2 coatings being baked for 8 minutes at temperatures ranging from 280° F. to 350° F.

Substitution of "Buton" 100, low molecular weight (8,000–10,000 mol. wt.) copolymer of butadiene-1,3 and styrene, formerly known as "C" oil MD-420, "Butarez" 25 oil, butadiene-1,3 polymer, EX-84 polymer of butadiene-1,3 prepared by free radical catalyzed polymerization to molecular weight of about 2,500; and butadiene/alpha methyl styrene copolymer of about 2,000 molecular weight prepared by $BF_3$-etherate-water catalyzed polymerization respectively substituted wholly or in part for the butadiene-1,3 homopolymer specified in Example 2 provide cured coatings having a taste rating in the range of 75 to 80.

A modification of the composition of Example 2, identical except for a content of 7 parts of the channel type carbon black pigment per 100 parts of the polymer of butadiene-1,3, provides a cured coating under the indicated coating conditions which is taste-rated likewise in the range of 75 to 80. A borderline taste rating of 70 is observed when the coating has an effective carbon black pigment content below the preferred minimum of 4 parts per 100 parts of the film-forming polymer and curing is at an effective temperature below the preferred minimum of 300° F. coupled with a coating weight above the ordinary average of about 5 milligrams per square inch.

These taste evaluation ratings show that practical variations in the curing conditions, i.e., variations in curing temperature, curing time, and in metal drier composition and concentration are not adequately effective in the absence of the channel type carbon black pigment toward providing a cured coating acceptable for use in contact with beer under present standards.

Metal containers having the cured carbon black modified polymer of butadiene-1,3 as the protective interior coating, in addition to being useful in packaging beer and similar aqueous alcoholic malt beverages, can be used satisfactorily for packaging soft drinks and other potable aqueous liquids without detrimental effect on the taste quality.

While these polymer of butadiene-1,3 coating compositions modified with channel type carbon black pigment are used ordinarily as a topcoat in combination with a polymer of butadiene-1,3 basecoat or as the sole interior coating of the sanitary can, they are effective also when used as a topcoat in combination with other ordinary basecoats in commercial use for interior can lining, e.g., basecoats formulated with oleoresinous varnishes, phenolic resin baking varnishes, epoxy resin varnishes and drying oil-modified epoxy ester varnishes. In basecoat-topcoat combinations, the basecoat is applied ordinarily at a coating weight of about 2 to 6 milligrams per square inch and the topcoat is applied ordinarily at a coating weight of 3 to 10 milligrams per square inch with a coating weight of 4 to 7 milligrams of topcoat being ordinary practice. Under these conditions, the invention coating composition applied as a topcoat over the cured basecoats provide significant improvement in the inhibition of the development of off-taste in potable liquid products susceptible to taste degradation when packaged in contact with the can lining.

Although application of the coating is directed particularly to use on sheet steel and tin-coated sheet steel of the type used ordinarily in "tin-can" fabrication, the coating can be used with similar success on aluminum containers. Ordinarily, such containers are drawn from metal to provide a seamless body without the usual end-closures, a crown seal serving as the closure.

While the several examples are illustrative of the products and processes of the invention, it is apparent that many widely different embodiments of the invention can be made without departing from the spirit and scope thereof, and, therefore, it is intended not to be limited except as defined by the appended claims.

We claim:
1. A liquid coating composition consisting essentially of 100 parts of a drying oil polymer of butadiene-1,3, in solution in a volatile liquid organic solvent therefor, and 2.5 to 20 parts of channel carbon black pigment dispersed in said solution, said oily polymer being further characterized by a molecular weight in the range of 700 to 20,000; said carbon black pigment being characterized by a
  fixed carbon content in the range of from about 83% to about 95%, an effective surface area in the range of from 90 to about 270 square meters per gram based on particle size distribution, and an active surface complex of carbon and oxygen which essentially comprises the volatile loss on heating at 1750° F. in establishing the fixed carbon content.
2. The composition of claim 1 in which the polymer of butadiene-1,3 is a homopolymer.

3. The composition of claim 1 in which the polymer of butadiene-1,3 is a copolymer of a monomer mixture consisting essentially of at least 75% by weight of butadiene-1,3 and at least one alpha, beta monoethylenically unsaturated hydrocarbon monomer copolymerizable therewith.

4. The composition of claim 3 in which the ethylenically unsaturated monomer is styrene.

5. The composition of claim 1 in which the carbon black is an impingement carbon black characterized by a mean particle-size diameter in the range of about 10 to 28 millimicrons.

6. A liquid coating composition of claim 1 which further contains an innocuous metal drier composition consisting essentially of an innocuous drier of a siccative metal of the group consisting of iron, zinc, cobalt and manganese, and having iron in siccative form present therein, the proportion of said metal drier composition being sufficient to provide from 25 to 5000 p.p.m. of siccative metal, based on the weight of said polymer of butadiene-1,3, of which at least 25 p.p.m. is siccative iron, the content of siccative iron being in preponderant proportion relative to the total content of siccative metal.

7. A liquid coating composition of claim 6 which contains tetraoctyl orthotitanate in an effective small proportion sufficient to enhance fracture resistance of the cured coating, and an effective small proportion of a liquid methyl siloxane polymer sufficient to improve the application properties of the liquid coating composition.

8. Coated sheet metal can stock having on one surface thereof a protective thin cured polymeric coating of the composition of claim 1.

9. Coated sheet metal stock having on at least one surface a protective thin cured polymeric coating of the composition of claim 1.

10. An improved metal container for hermetically packaging a potable aqueous liquid consisting of a tubular metal body portion and a bottom portion, said body portion being adapted to receive a top closure for the purpose of hermetically sealing said container, the interior surface of said container having thereon a protective thin cured polymeric coating of the composition of claim 1.

11. An improved package of a potable aqueous liquid consisting essentially of a thin-walled metal container having a tubular body portion, a bottom portion and a top portion including a closure hermetically sealing the container, the interior surface of said metal container being coated with a cured protective thin polymeric coating of the composition of claim 6.

12. The package of claim 11 wherein the heat-curable coating composition consists essentially of a homopolymer of butadiene-1,3 as the essential organic film-forming material and contains 4 to 12.5 parts of channel type carbon black pigment for each 100 parts of said homopolymer and an innocuous drier of siccative iron in the proportion of about 25 to 2,500 parts of siccative iron per million parts by weight of said homopolymer, and said potable liquid content is an aqueous alcoholic malt beverage.

References Cited in the file of this patent
UNITED STATES PATENTS

| | | |
|---|---|---|
| 1,939,621 | Bruson | Dec. 12, 1933 |
| 2,072,770 | Reid | Mar. 2, 1937 |
| 2,424,736 | Brams | July 29, 1947 |
| 2,734,885 | Doak | Feb. 14, 1956 |
| 2,777,890 | Ikeda | Jan. 15, 1957 |
| 2,875,919 | Henderson | Mar. 3, 1959 |